United States Patent [19]

Bindel

[11] 4,222,425

[45] Sep. 16, 1980

[54] TIRE TRACTION CHAIN

[76] Inventor: Paul H. Bindel, 3946 W. North Ave., Chicago, Ill. 60647

[21] Appl. No.: 66,633

[22] Filed: Aug. 15, 1979

[51] Int. Cl.³ .............................................. B60C 27/02
[52] U.S. Cl. .................................... 152/234; 152/233; 152/241; 301/42
[58] Field of Search ............... 152/213 A, 213 R, 216, 152/233, 241, 232, 236, 237, 221, 222, 234, 235, 238; 238/14; 301/42; 305/39, 56

[56] References Cited

U.S. PATENT DOCUMENTS

| 3,064,703 | 11/1962 | Schieber et al. | 152/233 |
| 3,133,582 | 5/1964 | Schieber et al. | 152/233 |
| 3,208,498 | 9/1965 | Schieber et al. | 152/225 |
| 3,362,450 | 1/1968 | Brown | 152/233 |
| 3,566,949 | 3/1971 | Schieber et al. | 152/237 |
| 3,854,514 | 12/1974 | Edwards | 152/233 |

Primary Examiner—John T. Goolkasian
Assistant Examiner—Robert A. Dawson
Attorney, Agent, or Firm—Rummler & Snow

[57] ABSTRACT

A tire traction chain for automobiles, trucks and the like whereby the same is placed over the tire and secured at one end to arcuate slots in the wheel and at the other end to a lug bolt.

5 Claims, 10 Drawing Figures

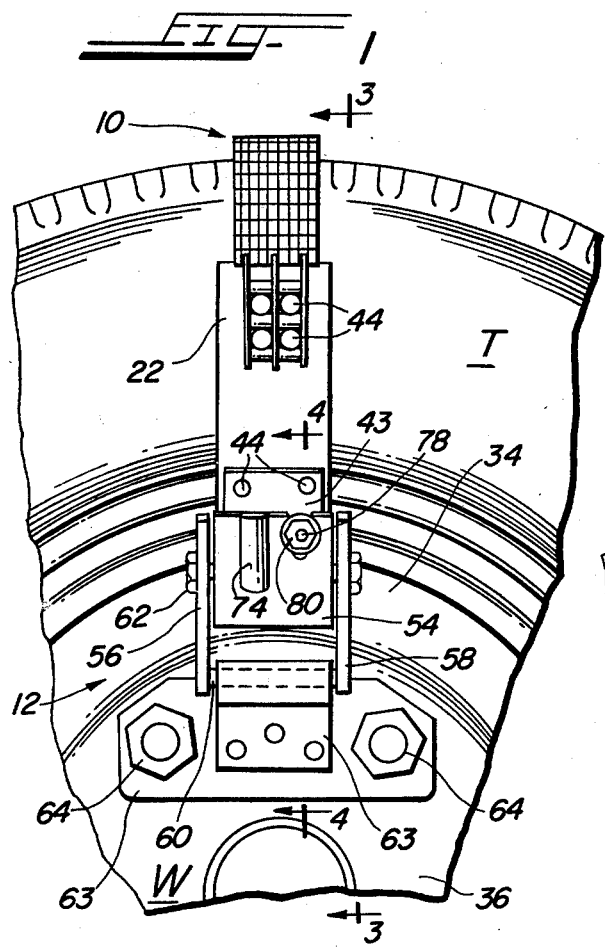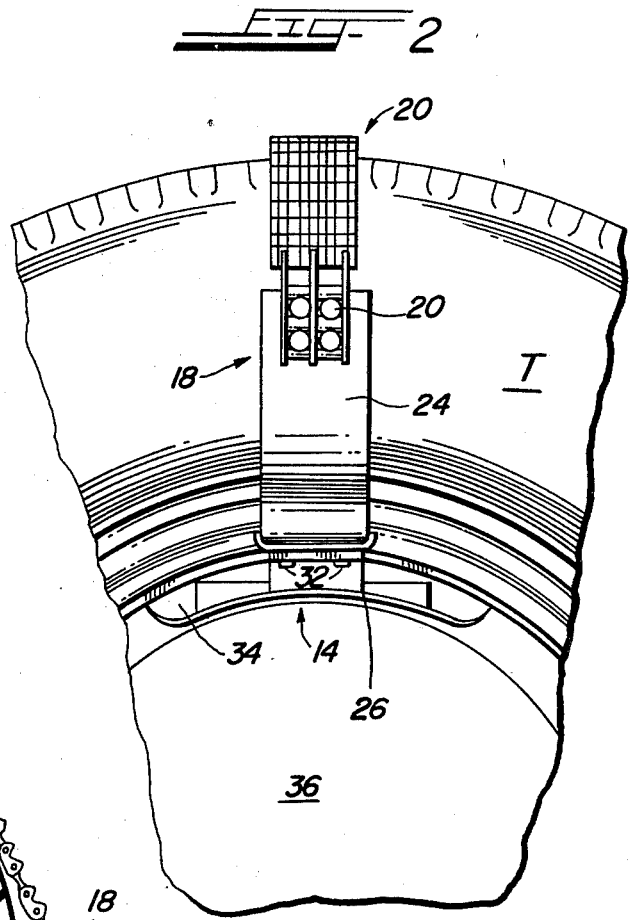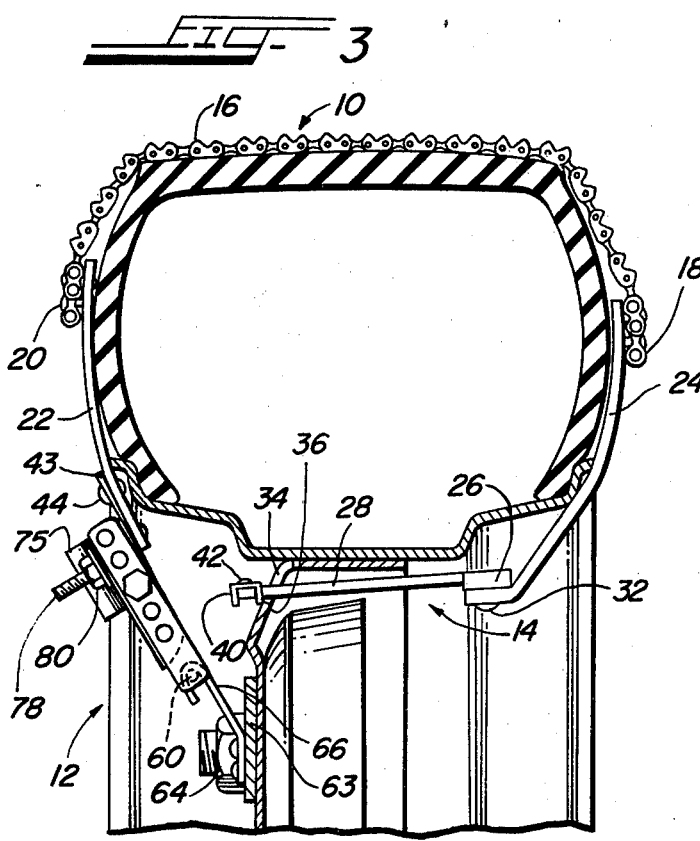

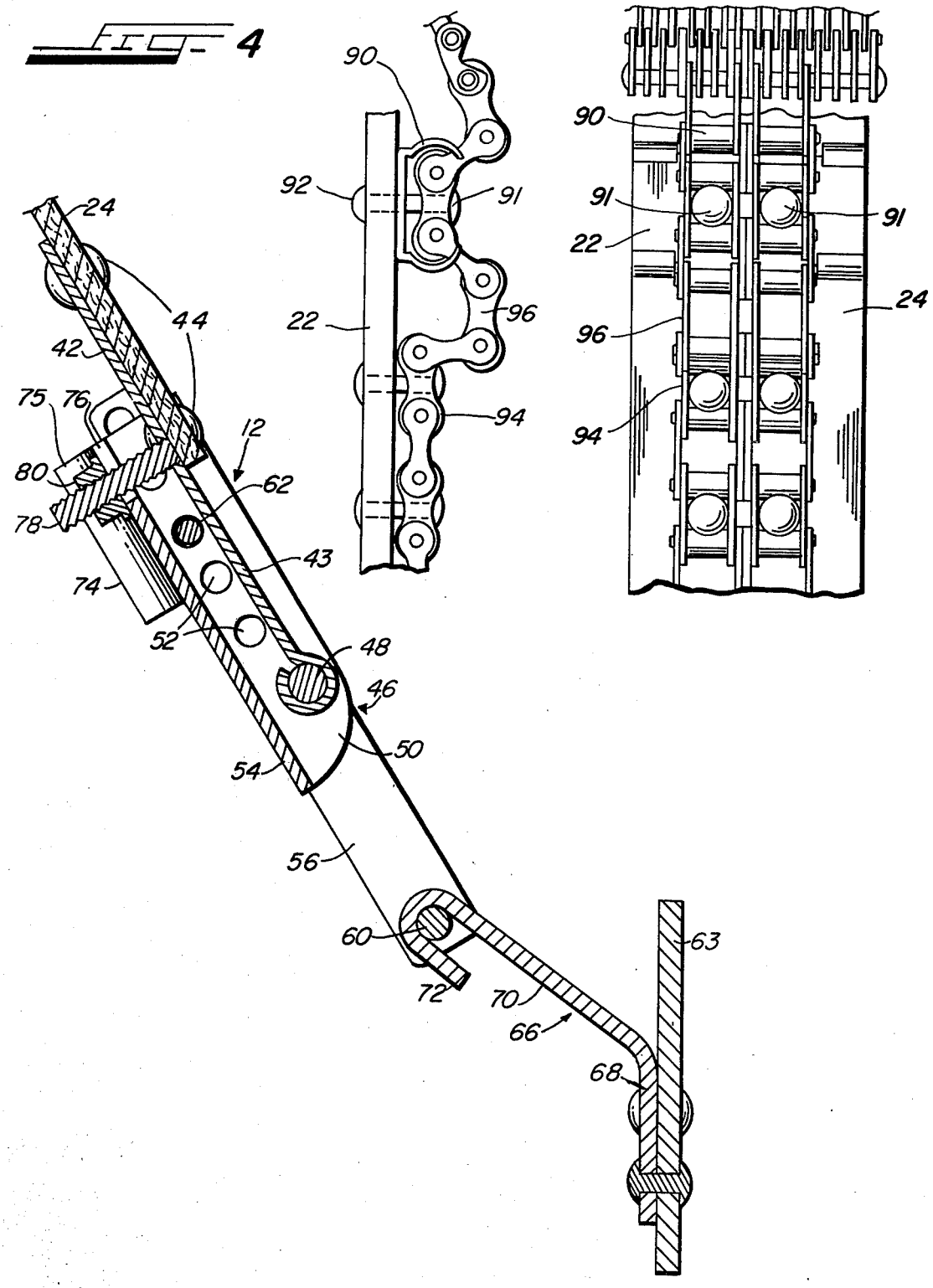

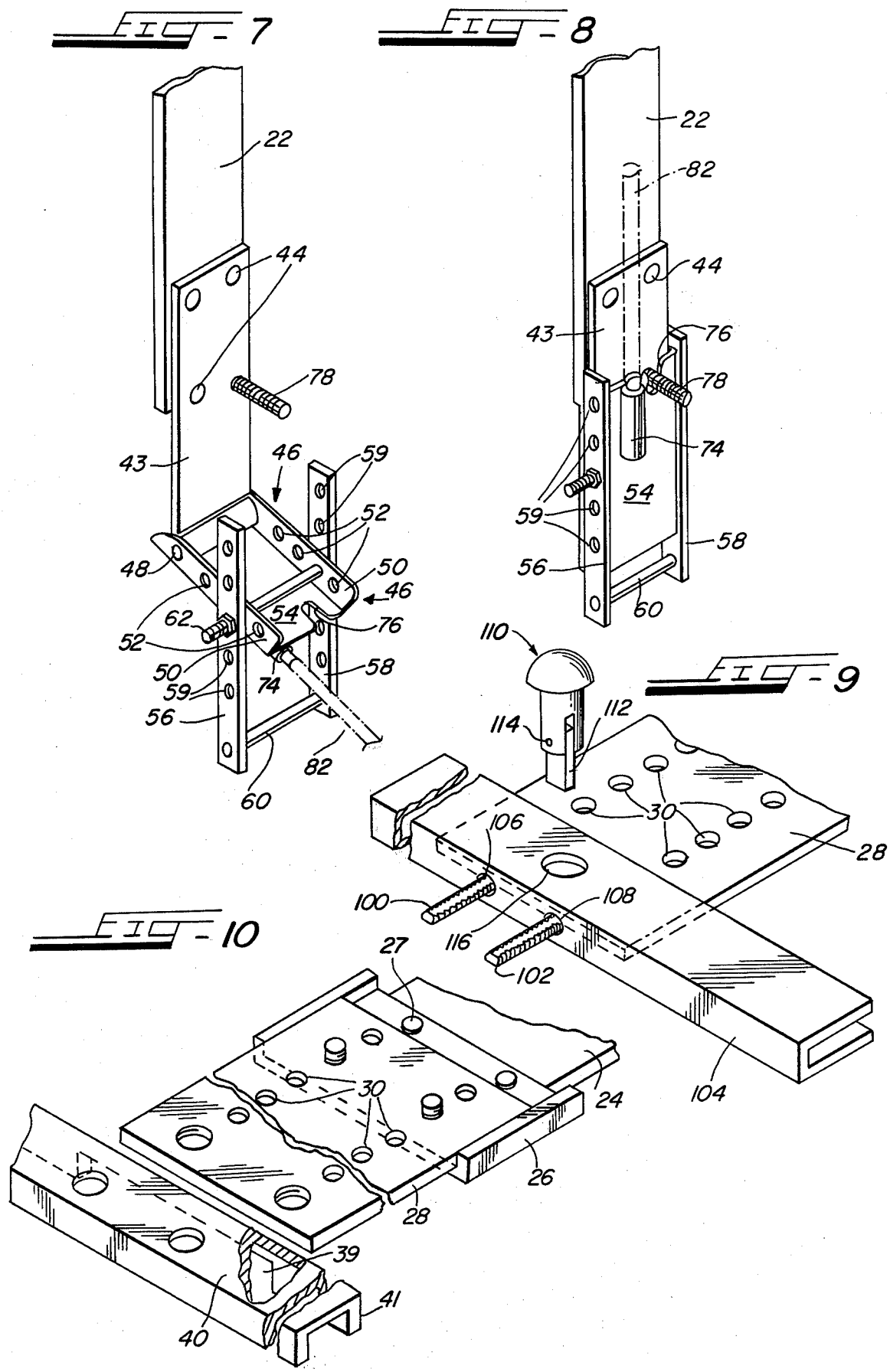

TIRE TRACTION CHAIN

Applicant is the owner of the following U.S. Pat. Nos:
3,064,703 granted Nov. 20, 1962;
3,133,582 granted May 19, 1964;
3,208,498 granted Sept. 28, 1965; and
3,566,949 granted Mar. 2, 1971.

SUMMARY OF THE INVENTION

A traction tire chain for vehicle tires wherein the chain is placed across the tire and one end of the chain is removably secured in one of the arcuate slots adjacent the periphery of the plate of the wheel while the opposite end is secured to one or more of the tire wheel mounting lugs, with toggle locking latches to mount and clamp the chain to the tire, and for ready and quick removal, and further readily adjustable features to use the device of the invention on different kinds or sizes of tires, and further to provide a simple latching mechanism on the face of the tire to securely latch the traction chain to the tire and wheel.

BRIEF DESCRIPTION OF THE DRAWINGS

FIG. 1 is a fragmentary elevational view of the front side of a vehicle tire and wheel showing the front latching mechanism;

FIG. 2 is a fragmentary view of the rear side of the device of FIG. 1;

FIG. 3 is a fragmentary cross-sectional view taken on the line 3—3 of FIG. 1;

FIG. 4 is a cross-sectional view taken on the line 4—4 of FIG. 1;

FIG. 5 is an enlarged side elevation of the traction chains showing manner of mounting chains to get additional traction surface;

FIG. 6 is a fragmentary front elevational view of FIG. 5;

FIG. 7 is a perspective view of the locking mechanism for the traction chain in open position;

FIG. 8 is a perspective view of the device of FIG. 6 in locked position;

FIG. 9 is a perspective view of a modified form of the rear connector mechanism to the wheelplate; and FIG. 10 is a perspective view of the rear connector U-plate anchoring means.

DETAILED DESCRIPTION OF THE DRAWINGS

The device of the present invention comprises a tread chain 10 and front and rear connector elements 12, 14, respectively.

The tread chain 10 may be of almost any conventional wide type having a middle section 16 between a pair of end sections 18, 20. The form shown herein is substantially similar to those shown in my hereinabove mentioned patents. In each tread chain, the middle section 16 is made up of a plurality of rows and of a length to extend beyond the circumferential edges of the tread section of the tire T. The end sections 18, 20 are lengths of conventional sprocket chains, the opposite free ends of which are attached, respectively, to the hereinafter described components that constitute the connector elements 12, 14.

It is these connector elements 14, 16 and associated clamping structures, as well as other features, that constitute improvements over my aforesaid patented inventions.

The sprocket chains 18, 20 are riveted to one end of a heavy leather composition material 22, 24, respectively, the same being protection for the sidewalls of the tire T.

The rear connector 14 comprises a U-shaped plate 26 to which the distal end of the material 24 is riveted adjacent one end. Said plate 26 is provided with a series of pairs of opposed perforations 27 (see FIG. 10). An elongated flat plate 28 is provided with a series of spaced pairs of threaded perforations 30 (see FIG. 10) and is secured at one end to said plate 26 by screws 32 and between the sidewalls of the U-shaped plate 26. The apertures are also for adjustability with respect to U-plate 26 and depend on the size of the tire T.

The plate 28 is inserted from the rear of the wheel W through one of the usual arcuate slots 34 in the face plate 36 of the wheel W and anchored therein by attaching an elongated, inverted, U-shaped channel 40 (positioned at right angles to the long axis of plate 28) containing a pair of spaced perforations, through which bolts 42 are threadedly engaged in the threaded apertures 30. The channel 40 will lie against the front of the face plate 36 and prevent detachment of the rear connector 14.

The inverted U-shaped channel is shown in FIG. 10 and has one wall 41 cut away medially to form an opening as at 39 for the reception of the free end of the plate 28 as shown and anchored by bolts 42.

The front connector has an elongated flat plate 43 anchored at one end to the lower end of member 22 by rivets 44 (see FIGS. 1 and 6). The opposite end of plate 43 is pivotally secured to one end of a substantially elongated, U-shaped channel 46 (see FIG. 7) by rod 48 extending between and anchored to one end of the sidewalls 50, adjacent the wide connecting wall 54. The sidewalls 50 are provided with a series of opposed, spaced perforations 52.

A U-shaped clamping member comprises a pair of arms 56, 58 each having a series of opposed perforations 59 therein and a clamping rod 60 anchored thereto and therebetween said arms 56, 58 at the other end. A bolt 62 is inserted through opposed apertures 52, 54 in the arms 56, 58 and through apertures 52 to pivot the arms 56, 58 to the walls 50 as shown in FIG. 6.

A plate 63 having perforations in its distal ends is arranged to be clamped to the face 36 of the wheel by the usual lugbolts 64. Anchored medially to the plate 63 is a catchplate 66 with one end 68 riveted to said plate 63. The balance of the plate 66 is bent angularly upwardly and outwardly and terminates in a hook 72 to engage the rod 60 (see FIG. 4).

The outer face of the connecting member 54 is provided with a metal tube 74 welded to the upper end of said connecting member 54. Said member 54 is also provided with a slot 76 to receive the screw 78, having one end anchored to the plate 43 and aligned with the slot 76. When the member 54 is positioned substantially against the plate 42, the screw 78 will set in the slot 76 and when a nut 80 is turned upon the screw, the entire traction chain is locked on the tire T.

In operation, the traction chain is placed on the tire T, the plate 28 of the rear connector is inserted through the aperture 34 and the plate 40 secured thereto. The front end is opened as shown in FIG. 7. The hook 22 is placed on the rod 60 and a long rod 82 (could be one end of the usual lug tool) is inserted in the tube 74 from the top end 75 and the plate 46 is drawn upwardly to the position shown in FIGS. 1, 3, 4, 7 and 8 with the screw positioned in the slot 76. The nut 80 is then connected to the screw. The rod 82 is then removed.

In larger or smaller tires, the pivot pin 62 and screws 32 may be inserted in other apertures in arms 56, 58, and plate 28, respectively, to shorten or lengthen the traction device.

In the modification shown in FIGS. 5 and 6, a U-shaped plate 90 is anchored to the materials 22, 24 adjacent its upper end, through the first link 91 of the sprocket chain by rivets 92. The third link 94 of the sprocket chain is shifted upwardly as viewed in FIG. 5 so as to raise the second link 96 away from the material 22 and then the link 94 is riveted to the material. Thus, by raising the link 96 above the other chains, additional traction is obtained.

Another modification is shown in FIG. 9 wherein the plate 28 is provided with a large aperture in its distal end and a pair of spaced rods 100, 102 are welded to the end of plate 28 whereby the rods form an extension of plate 28. An elongated, U-shaped channel 104, lying edgewise, is provided with a pair of spaced perforations 106, 108 through which the rods 100, 102 extend. A headed rod 110 is slit endwise to receive a portion of a small, elongated, flat plate 112 which is held therein with a pivot 114. The plate 112 is snugly held in the slit. The rod is inserted in the aperture 116 and the corresponding aligned aperture in plate 28 and the flat plate 112 is moved to the horizontal to prevent the member 104 from separating from plate 28.

It is to be understood that numerous details may be altered or omitted without departing from the spirit of this invention as defined by the following claims.

I claim:

1. In a motor vehicle traction chain comprising a motor vehicle wheel having a face plate with arcuate cutouts adjacent the periphery, including a tire and wheel lugs, in combination:
   (a) tread chains having sprocket chains on the free ends of said tread chain;
   (b) a pair of front and rear clamping members each removably attached to the face plate of the vehicle wheel;
   (c) front and rear elongated strips of leather-like material secured at one end to one of each of said sprocket chains;
   (d) an elongated plate secured to the end of said rear material, said plate being inserted in and through one of said arcuate cutouts from the rear of said face plate;
   (e) U-shaped channel secured transversely of and medially to said elongated plate against the face of the face plate to form the rear clamping member; and
   (f) the front clamping member anchored to a wheel lug.

2. The device according to claim 1 wherein a short plate having its edges bent upwardly to form a U-shaped channel is first secured to said rear material at its free end and is provided with pairs of opposed apertures, said elongated plate provided with a series of pairs of opposed threaded perforations whereby to anchor said short plate thereto in varying positions depending upon the size of the tire.

3. The device according to claim 2 wherein the front clamping member comprises a metal plate secured to the free end of said material having an upstanding threaded rod thereon, and a pair of spaced ears at the free end thereof, a flat plate having the sidewalls turned upwardly at right angles to form a U-channel and each containing a series of opposed perforations from end to end, a rod secured between said sidewalls and pivotally secured to said ears, a pair of relatively thick arms secured together at one end by a rod, said arms pivotally and adjustably secured to said sidewalls, a hook removably secured to said face plate of the wheel for capturing said latter rod, and means for shifting said aforementioned plate about its pivot to lock said front clamping member to a tire and wheel.

4. The device according to claim 1 wherein threaded perforations in said plate are provided with a pair of outwardly extending, spaced, threaded rods to which said U-shaped channel is secured.

5. The device according to claim 3 wherein said flat plate of said U-channel contains a slotted aperture into which said threaded rod seats in clamped position and anchored by a nut.

* * * * *